United States Patent
Hirose

(10) Patent No.: US 9,381,881 B2
(45) Date of Patent: Jul. 5, 2016

(54) SHOCK ABSORBING MEMBER

(75) Inventor: Satoshi Hirose, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 29 days.

(21) Appl. No.: 14/237,755

(22) PCT Filed: Aug. 7, 2012

(86) PCT No.: PCT/JP2012/070109
§ 371 (c)(1),
(2), (4) Date: Feb. 7, 2014

(87) PCT Pub. No.: WO2013/022001
PCT Pub. Date: Feb. 14, 2013

(65) Prior Publication Data
US 2014/0191532 A1 Jul. 10, 2014

(30) Foreign Application Priority Data
Aug. 9, 2011 (JP) ................................. 2011-174200

(51) Int. Cl.
*F16F 7/12* (2006.01)
*B60R 19/34* (2006.01)
*B62D 21/15* (2006.01)

(52) U.S. Cl.
CPC .............. *B60R 19/34* (2013.01); *B62D 21/152* (2013.01); *F16F 7/12* (2013.01); *B62D 21/15* (2013.01); *F16F 7/123* (2013.01)

(58) Field of Classification Search
CPC ............ F16F 7/12; F16F 7/123; B62D 21/15; B62D 21/152; B60R 19/34
USPC ..................... 188/377, 371, 376; 296/187.03; 248/556, 557, 636; 244/119, 141, 244/129.1, 117 R, 120, 123.13, 123.8, 124; 52/837–842; 280/784
See application file for complete search history.

(56) References Cited

U.S. PATENT DOCUMENTS 4,593,870 A * 6/1986 Cronkhite et al. ........ 244/117 R
4,684,151 A * 8/1987 Drewek ........................ 280/784
(Continued)

FOREIGN PATENT DOCUMENTS

EP 2 055 983 A2 5/2009
JP 07-145842 A 6/1995
(Continued)

OTHER PUBLICATIONS

International Search Report issued in PCT/JP2012/070109, dated Nov. 20, 2012.

*Primary Examiner* — Thomas Irvin
(74) *Attorney, Agent, or Firm* — Birch, Stewart, Kolasch & Birch, LLP

(57) ABSTRACT

A hollow columnar shock absorbing member (1) has an axis (O), a plurality of rectangular walls (1a, 1b, 1c, 1d) extending parallel to axis (O), and a polygonal cross-section perpendicular to axis (O), wherein the shock absorbing member extends in the direction of axis (O) and absorbs externally-applied impact energy while buckling in the direction of axis (O). The shock absorbing member has at least one bead (2a, 2b, 2c, 2d) formed on at least one wall (1a, 1b, 1c, 1d) among the plurality of walls (1a, 1b, 1c, 1d), the at least one bead (2a, 2b, 2c, 2d) providing the origin of the buckling. The at least one bead (2a, 2b, 2c, 2d) is positioned so as to be deviated towards one edge of a wall (1a, 1b, 1c, 1d) on which the at least one bead (2a, 2b, 2c, 2d) is formed, the edge extending parallel to axis (O).

16 Claims, 23 Drawing Sheets

(56) References Cited

U.S. PATENT DOCUMENTS

| | | | | |
|---|---|---|---|---|
| 4,702,515 | A * | 10/1987 | Kato et al. | 296/187.01 |
| 5,033,593 | A * | 7/1991 | Kazuhito | 188/377 |
| 5,048,345 | A * | 9/1991 | Hagiwara | B62D 1/192 29/897.2 |
| 5,403,049 | A * | 4/1995 | Ebbinghaus | 293/133 |
| 5,431,445 | A * | 7/1995 | Wheatley | 280/784 |
| 5,566,777 | A * | 10/1996 | Trommer et al. | 180/232 |
| 5,732,801 | A * | 3/1998 | Gertz | 188/377 |
| 6,474,709 | B2 * | 11/2002 | Artner | B60R 19/34 293/133 |
| 6,695,393 | B1 * | 2/2004 | Aouadi | B62D 21/152 296/187.09 |
| 6,736,448 | B2 * | 5/2004 | Hanakawa | B62D 21/152 296/187.09 |
| 6,808,215 | B2 * | 10/2004 | Sakuma et al. | 293/102 |
| 7,213,867 | B2 * | 5/2007 | Haneda et al. | 296/132 |
| 7,389,860 | B2 * | 6/2008 | Abu-Odeh | B62D 21/15 188/376 |
| 7,677,617 | B2 * | 3/2010 | Stewart | B60R 19/34 293/133 |
| 7,980,607 | B2 * | 7/2011 | Kanaya et al. | 293/132 |
| 8,689,955 | B2 * | 4/2014 | Mori | 188/377 |
| 9,079,553 | B2 * | 7/2015 | Banasiak | B60R 19/34 |
| 9,228,629 | B2 * | 1/2016 | Hirose | F16F 7/12 |
| 2008/0012386 | A1 | 1/2008 | Kano et al. | |
| 2010/0072788 | A1 * | 3/2010 | Tyan et al. | 296/205 |
| 2011/0006560 | A1 * | 1/2011 | Honda et al. | 296/187.08 |
| 2011/0015902 | A1 * | 1/2011 | Cheng et al. | 703/1 |
| 2012/0152675 | A1 * | 6/2012 | Mori | 188/377 |
| 2013/0221692 | A1 * | 8/2013 | Wang et al. | 293/132 |
| 2014/0103670 | A1 * | 4/2014 | Iijima et al. | 293/133 |
| 2014/0174867 | A1 * | 6/2014 | Hirose | 188/377 |

FOREIGN PATENT DOCUMENTS

| | | |
|---|---|---|
| JP | 9-277953 A | 10/1997 |
| JP | 9-277954 A | 10/1997 |
| JP | 10-138950 A | 5/1998 |
| JP | 2000-193008 A | 7/2000 |
| JP | 2005-1462 A | 1/2005 |
| JP | 2005-153567 A | 6/2005 |
| JP | 2005-225394 A | 8/2005 |
| JP | 2005-325968 A | 11/2005 |
| JP | 2006-194300 A | 7/2006 |
| JP | 2006-207724 A | 8/2006 |
| JP | 2006-207726 A | 8/2006 |
| JP | 2007-30725 A | 2/2007 |
| JP | 2008-18792 A | 1/2008 |
| JP | 2009-113596 A | 5/2009 |
| JP | 2009-154587 A | 7/2009 |
| JP | 2009-168115 A | 7/2009 |
| JP | 2009-285668 A | 12/2009 |
| JP | 2009-286221 A | 12/2009 |
| JP | 2010-126067 A | 6/2010 |
| JP | 2011-56997 A | 3/2011 |
| WO | WO 2011030453 A1 * | 3/2011 |

* cited by examiner

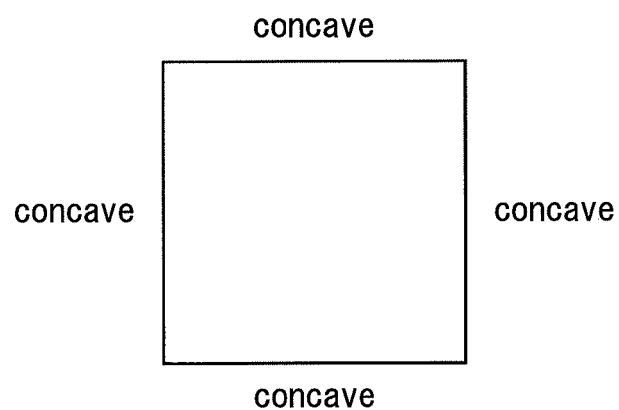
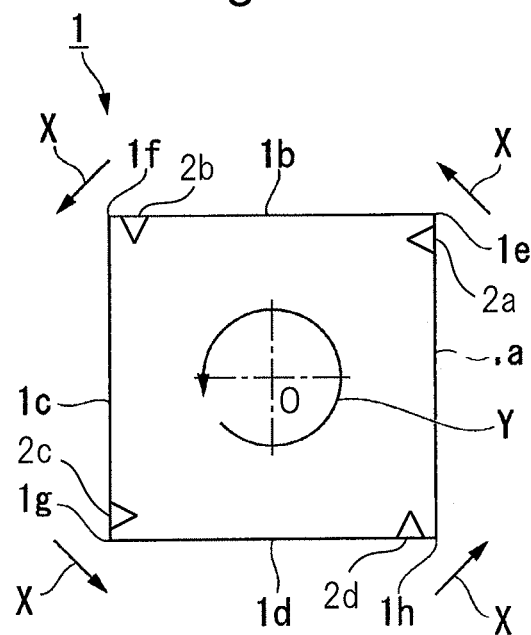

Fig.8A
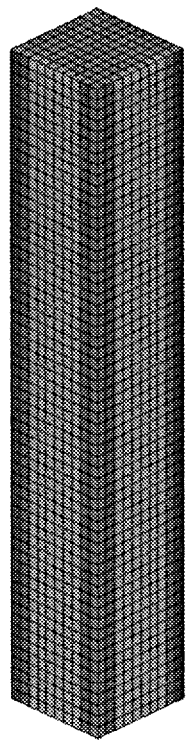
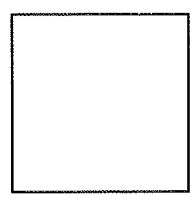

Fig.8B
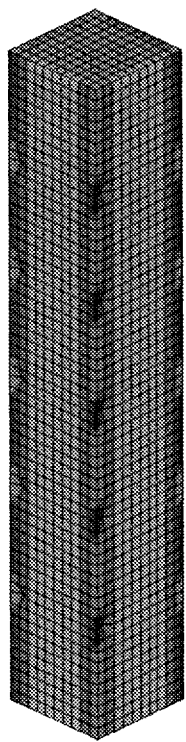
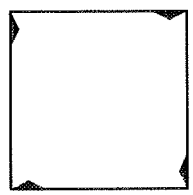

Fig.8C
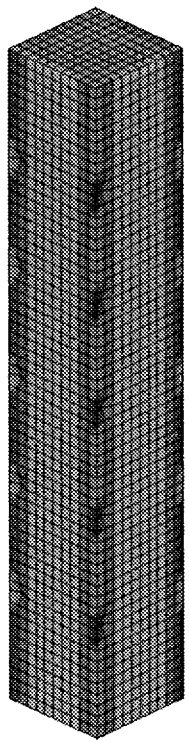
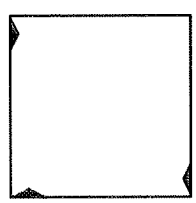

Fig.8D
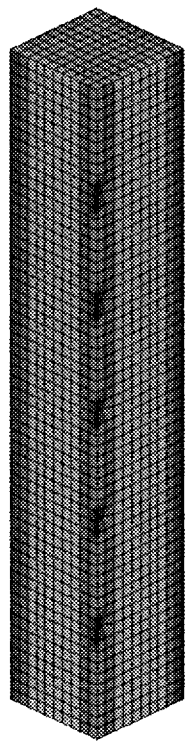
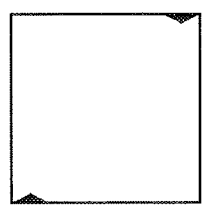

Fig.8E
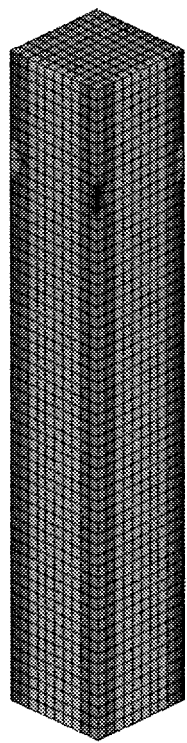
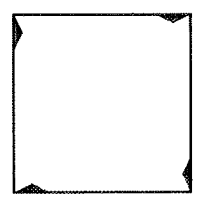

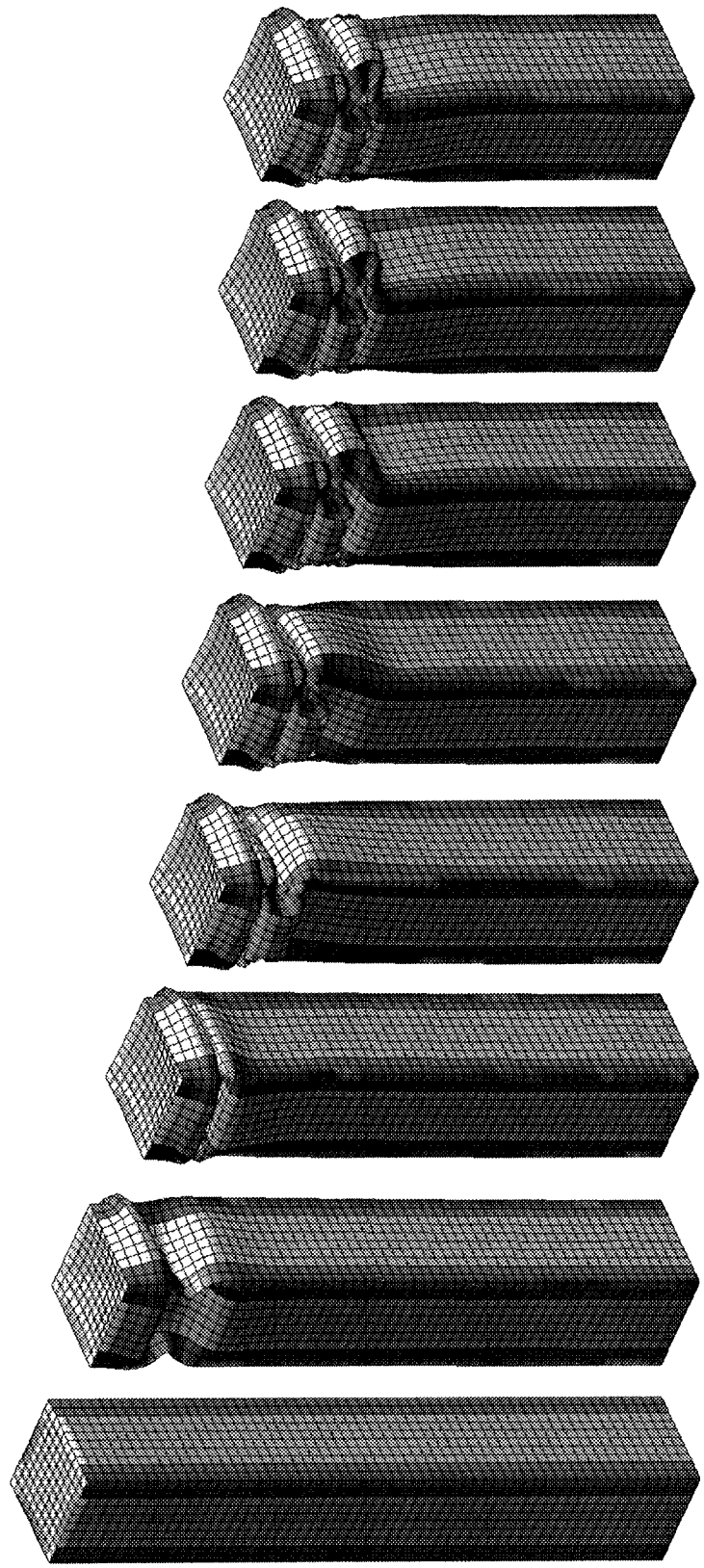

SHOCK ABSORBING MEMBER

TECHNICAL FIELD

The present invention relates to a shock absorbing member which absorbs externally-applied impact energy while buckling.

BACKGROUND ART

In recent years, in the automotive field, etc., improvement in fuel efficiency and motion performance have been sought, while improvement in collision safety has also been sought. As a chassis of a motorcar, in order to balance reduced weight and high stiffness, a chassis structure referred to as a "monocoque body," wherein a frame and a body are integrally formed, is generally used. Further, in the chassis of a motorcar, in order to maintain a survival space for a driver and a passenger in a collision, a shock absorbing structure is generally used, wherein a space (for example, an engine room or a luggage room) other than a cabin is preferentially collapsed, so that impact load applied to the cabin is attenuated as possible and the deformation of the cabin is minimized.

Therefore, in order to constitute a chassis structure with high collision-safety performance, it is important to how to effectively absorb the impact energy at the time of collision. To this end, a shock absorbing member for effectively absorbing the impact energy at the time of collision has been strenuously developed (for example, see Patent Literatures 1 to 15).

Generally, as a shock absorbing member, a hollow columnar thin-walled structure (or a hollow columnar member) manufactured by jointing press-formed steel plates by welding, etc., is used. In order to balance reduced weight and high stiffness, as described above, the shock absorbing member is constituted by a hollow member having a polygonal cross-section such as a tetragon or a hexagon. Such a shock absorbing member is used as a front-side member of a chassis, for example, and absorbs the impact energy by buckling in an axial direction (or axial crushing) when impact load is applied to one end of the member at the time of collision. Therefore, in order to improve the shock-absorbing performance, it is important to effectively generate such buckling and increase the buckling load thereof.

In the prior art, in order to solve the above problems in terms of material, a relatively thick or relatively high-strength steel plate is used to manufacture a shock absorbing plate so as to increase the buckling load. On the other hand, as a structural measure, a dimple (or a bead) providing the origin of the buckling is arranged so as to effectively generate the buckling. Further, by forming a cross-section of the hollow shock absorbing member as a polygonal shape, the buckling load is increased.

However, when the plate thickness of the above shock absorbing member is increased, the weight of the member is increased, whereby the weight of a chassis including the shock absorbing member is also increased. As a result, fuel efficiency and driving performance of a motorcar are deteriorated. Further, in a high-strength steel plate, the degree of elongation is generally decreased in inverse proportion to the strength thereof. Therefore, the formability of a high-strength steel plate is not good, and thus there are limitations to increase the strength of a steel plate for the shock absorbing member at present.

Incidentally, when the buckling load of the shock absorbing member is solely increased, a minimum impact load for generating the buckling is increased. In this case, the impact load applied to the shock absorbing member is not absorbed by the deformation of the shock absorbing member, whereby the impact load with no change is transmitted to another structure such as a cabin. Further, a risk of injury to driver and a passenger is increased, since a portion which is not to be deformed is buckled; it is difficult to keep a survival space for the drive and the passenger due to the deformation of the cabin; or a significant change of acceleration is applied to the driver and the passenger.

Therefore, for example, the shock absorbing member is configured as a straight member in order to keep the cross-section from a start end of the buckling constant as possible, and secure a certain amount of deformation due to the buckling. Further, in order to reduce an initial impact load applied to the shock absorbing member, the shock absorbing member is stably buckled into concertinas due to an arrangement of the beads as described above.

However, there is no firm theory for determining the above arrangement of the beads, and at present, the arrangement is determined by repeating multiple times a buckling test or a computer simulation regarding the shock absorbing member. Accordingly, it is necessary to repeatedly carry out the above test or simulation in relation to each kind of chassis, whereby design efficiency is deteriorated. Moreover, since various load conditions or buckling modes predicted when actual collision cannot be dealt with, it is very difficult to optimize the arrangement of the beads by using the above techniques.

CITATION LIST

Patent Literature

PLT 1: Japanese Unexamined Patent Publication (kokai) No. 2009-286221
PLT 2: Japanese Unexamined Patent Publication (kokai) No. 2009-285668
PLT 3: Japanese Unexamined Patent Publication (kokai) No. 2009-168115
PLT 4: Japanese Unexamined Patent Publication (kokai) No. 2009-154587
PLT 5: Japanese Unexamined Patent Publication (kokai) No. 2009-113596
PLT 6: Japanese Unexamined Patent Publication (kokai) No. 2008-018792
PLT 7: Japanese Unexamined Patent Publication (kokai) No. 2007-030725
PLT 8: Japanese Unexamined Patent Publication (kokai) No. 2006-207726
PLT 9: Japanese Unexamined Patent Publication (kokai) No. 2006-207724
PLT 10: Japanese Unexamined Patent Publication (kokai) No. 2005-225394
PLT 11: Japanese Unexamined Patent Publication (kokai) No. 2005-153567
PLT 12: Japanese Unexamined Patent Publication (kokai) No. 2005-001462
PLT 13: Japanese Unexamined Patent Publication (kokai) No. H10-138950
PLT 14: Japanese Unexamined Patent Publication (kokai) No. H09-277954
PLT 15: Japanese Unexamined Patent Publication (kokai) No. H09-277953
PLT 16: Japanese Unexamined Patent Publication (kokai) No. 2011-056997

SUMMARY OF INVENTION

Problem to be Solved by the Invention

Incidentally, in buckling modes (or compact-modes) wherein the above shock absorbing member is buckled into concertinas, a "concave-convex mixed mode" and a "concave-convex independent mode" are included. The concave-convex mixed mode is a deformation mode wherein both a concave portion and a convex portion of concertinas are present in an arbitrary transverse cross-section of a hollow columnar shock absorbing member which is buckled into concertinas by impact load. On the other hand, the concave-convex independent mode is a deformation mode wherein only a concave portion or a convex portion is present in the arbitrary transverse cross-section. In this regard, a ratio of a deformed portion to the entire member in the concave-convex independent mode is larger than that in the concave-convex mixed mode. Therefore, in the concave-convex independent mode, an amount of impact energy absorption relative to an amount of deformation (or an amount of crushing) is relatively high, and thus improved shock-absorbing performance can be obtained.

In a conventional shock absorbing member, various approaches have been made for increasing the amount of impact energy absorption while buckling the member into concertinas in the axial direction. However, there has been no approach for purposely induce the above concave-convex independent mode. In other words, in the compact mode of the conventional shock absorbing member, the concave-convex mixed mode is a major mode, and a mechanism for generating the concave-convex independent mode has not been found.

The present invention was made in view of the above background, and an object of the invention is to provide a shock absorbing member having improved shock-absorbing performance, in particular, a shock absorbing member capable of purposely inducing the concave-convex independent mode.

Means for Solving the Problem

In order to solve the above problems, the present invention provides a hollow columnar shock absorbing member comprising: an axis; a plurality of rectangular walls extending parallel to the axis; and a polygonal cross-section perpendicular to the axis, the shock absorbing member extending in a direction of the axis and being configured to absorb externally-applied impact energy while buckling in the direction of the axis, wherein the shock absorbing member has at least one bead formed on at least one wall among the plurality of walls, the at least one bead providing the origin of buckling, and wherein the at least one bead is positioned so as to be deviated towards one edge of a wall on which the at least one bead is formed, the edge extending parallel to the axis.

Effects of the Invention

According to the present invention, a shock absorbing member having improved shock-absorbing performance can be provided, in particular, the shock absorbing member can be effectively buckled in the direction of the axis by purposely inducing the concave-convex independent mode. As a result, the amount of externally-applied impact energy absorption is increased, and improved shock-absorbing performance can be obtained.

BRIEF DESCRIPTION OF DRAWINGS

FIG. 3B is a schematic view for exemplifying a transverse cross-section, other than the cross-section of FIG. 3A, perpendicular to the axis of the hollow columnar member in the concave-convex independent mode.

FIG. 4A is a schematic view for explaining a function of a shock absorbing member, wherein a dimple is formed as a bead on an outer surface of the shock absorbing member.

FIG. 8A is a perspective view of a shock absorbing member of comparative example 1, showing a state before impact load is applied to the shock absorbing member.

FIG. 8B is a perspective view of a shock absorbing member of working example 1, showing a state before impact load is applied to the shock absorbing member.

FIG. 8C is a perspective view of a shock absorbing member of working example 2, showing a state before impact load is applied to the shock absorbing member.

FIG. 8D is a perspective view of a shock absorbing member of comparative example 2, showing a state before impact load is applied to the shock absorbing member.

FIG. 8E is a perspective view of a shock absorbing member of comparative example 3, showing a state before impact load is applied to the shock absorbing member.

FIG. 9 is a perspective view of the shock absorbing member of comparative example 1, wherein deformation manner when impact load is applied to the shock absorbing member is calculated by FEM numerical analysis.

EMBODIMENTS FOR CARRYING OUT THE INVENTION

Hereinafter, a shock absorbing member according to the present invention will be explained in detail with reference to the drawings.

In FIGS. 1A to 1D, various deformation modes are illustrated, which are generated when impact load is applied to one end of a hollow linear columnar shock absorbing member in a direction of an axis thereof (or an axial direction), the shock absorbing member having a hollow square cross-section. The deformation modes as shown in FIGS. 1A to 1D are calculated by FEM (Finite Element Method) numerical analysis (or computer simulation) when the shock absorbing member is deformed by applied impact load.

Figure 1A:
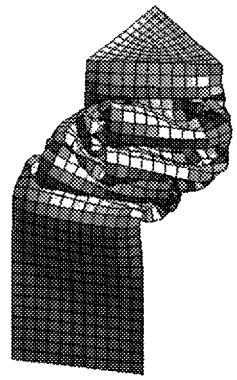
FIG. 1A is a perspective view of a hollow linear columnar member having a square hollow cross-section, wherein deformation of the member when impact load is applied to one end thereof in an axial direction is calculated by FEM numerical analysis, the view showing a state in which the member is bent by local buckling.
Figure 1B:
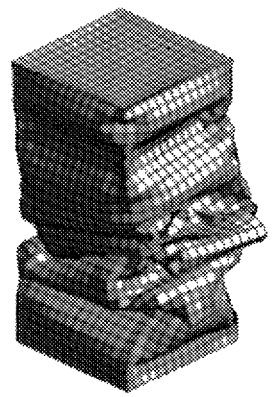
FIG. 1B is a perspective view of a hollow columnar member similar to FIG. 1A, wherein deformation of the member is calculated by FEM numerical analysis, the view showing a non-compact mode in which the member is irregularly buckled in the axial direction.
Figure 1C:
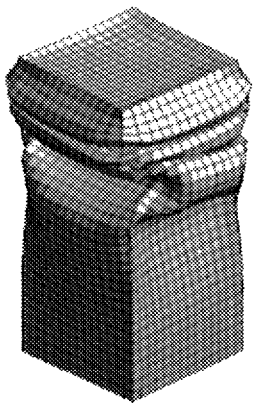
FIG. 1C is a perspective view of a hollow columnar member similar to FIG. 1A, wherein deformation of the member is calculated by FEM numerical analysis, the view showing a concave-convex mixed mode among compact modes in which the member is buckled into concertinas in the axial direction.
Figure 1D:
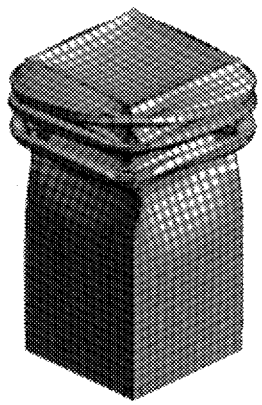
FIG. 1D is a perspective view of a hollow columnar member similar to FIG. 1A, wherein deformation of the member is calculated by FEM numerical analysis, the view showing a concave-convex independent mode among the compact modes in which the member is buckled into concertinas in the axial direction.
Figure 2A:
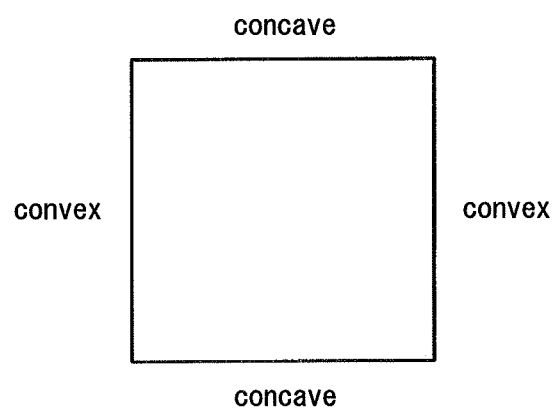
FIG. 2A is a schematic view for exemplifying an arbitrary transverse cross-section perpendicular to an axis of the hollow columnar member in the concave-convex mixed mode.
Figure 2B:
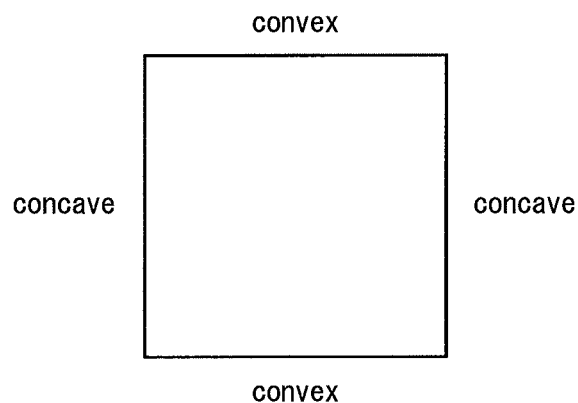
FIG. 2B is a schematic view for exemplifying a transverse cross-section, other than the cross-section of FIG. 2A, perpendicular to the axis of the hollow columnar member in the concave-convex mixed mode.
Figure 3A:
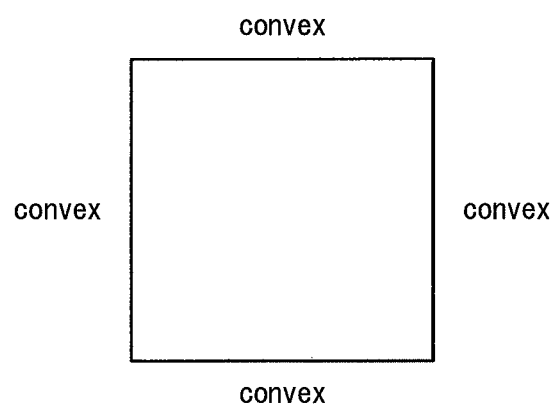
FIG. 3A is a schematic view for exemplifying an arbitrary transverse cross-section perpendicular to the axis of the hollow columnar member in the concave-convex independent mode.

FIG. 1A shows a state wherein the shock absorbing member is bent by local buckling. On the other hand, FIG. 1B shows a non-compact mode wherein the shock absorbing member is irregularly buckled in the axial direction. FIGS. 1C and 1D show modes wherein the shock absorbing member is buckled into concertinas in the axial direction. In other words, FIGS. 1C and 1D shows compact modes wherein the member is crushed so that a peak and a valley are alternately formed in the axial direction. In particular, FIG. 1C shows a concave-convex mixed mode of the compact modes. In the concave-convex mixed mode, both the valley (or a concave portion) and the peak (or a convex potion) of the concertinas are included in an arbitrary transverse cross-section of a hollow columnar member, as schematically shown in FIGS. 2A and 2B. To the contrary, FIG. 1D shows a concave-convex independent mode of the compact modes. In the concave-convex independent mode, only the valley (or a concave portion) or the peak (or a convex potion) of the concertinas is included in an arbitrary transverse cross-section of a hollow columnar member, as schematically shown in FIGS. 3A and 3B. In addition, the "concave-convex independent mode" and the "concave-convex mixed mode" may also be referred to as an "extension mode" and an "inextension mode," respectively.

In such a case, a ratio of a deformed portion to the entire member is increased as the deformation mode is shifted from FIG. 1A to FIG. 1D. Therefore, in the concave-convex independent mode as shown in FIG. 1D, an amount of impact energy absorption relative to an amount of deformation (crushing) of the member is the highest. In other words, in the concave-convex independent mode, the member can be buckled in the axial direction most effectively, whereby significantly high impact-absorbing performance can be obtained.

In the present invention, at least one bead is formed on at least one wall among a plurality of walls of the shock absorbing member, the at least one bead providing the origin of buckling, and the at least one bead being positioned so as to be deviated towards one edge of a wall on which the at least one bead is formed, the edge extending parallel to the axis. By virtue of this, the concave-convex independent mode can be purposely induced.

Concretely, in the present invention, a shock absorbing member 1 with a hollow square cross-section, as exemplified in FIG. 4A, has a center axis O, four walls 1a, 1b, 1c and 1d positioned around center axis O, wherein a plurality of dimples 2a, 2b, 2c and 2d are formed as beads on four walls 1a, 1b, 1c and 1d, respectively. Dimples 2a, 2b, 2c and 2d are positioned while being deviated towards one edge of walls 1a, 1b, 1c and 1d. In detail, in the embodiment of FIG. 4A, in each wall 1a, 1b, 1c and 1d in a cross-section perpendicular to center axis O, four dimples 2a, 2b, 2c and 2d are deviated towards edges or corners 1e, 1f, 1g and 1h which are positioned on the same side relative to centers Pc of four walls 1a, 1b, 1c and 1d in relation to a circumferential direction as indicated by an arrow Y, respectively. In addition, in this embodiment, a bottom surface of each dimple 2a, 2b, 2c and 2d is formed as a portion of a spherical surface.

Figure 4B:
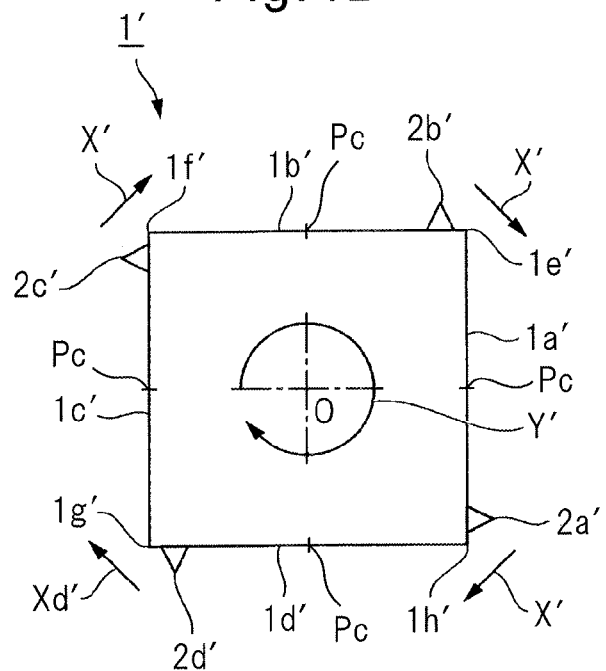
FIG. 4B is a schematic view for explaining a function of a shock absorbing member, wherein a bulge is formed as a bead on an outer surface of the shock absorbing member.
Figure 5A:
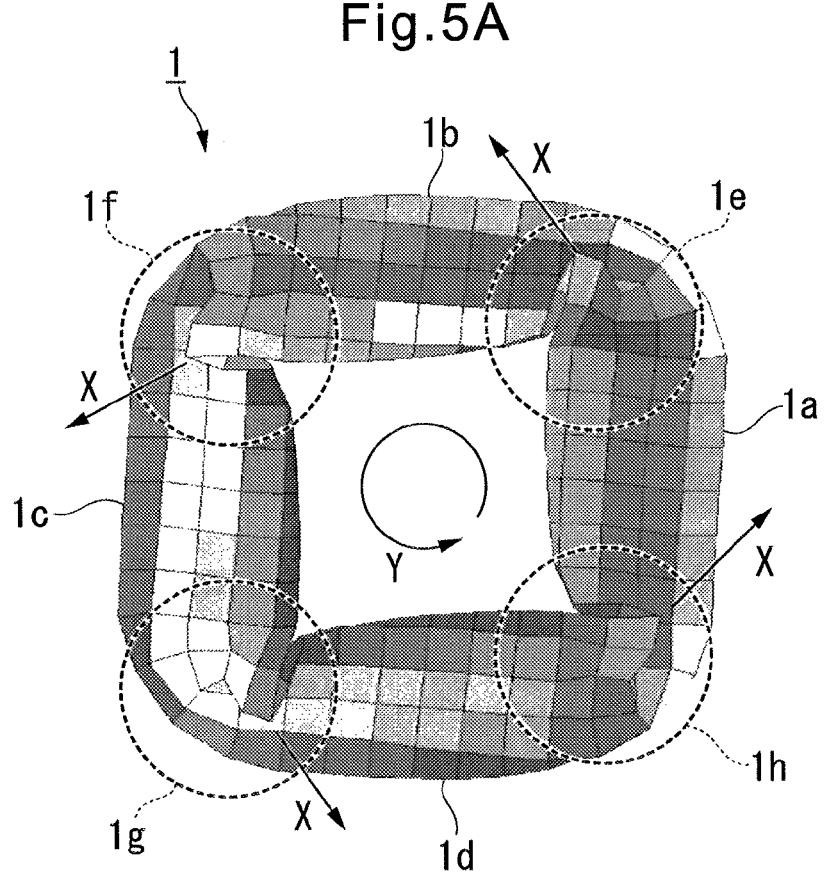
FIG. 5A is a transverse cross-sectional view of the hollow columnar member after buckling, calculated by FEM numerical analysis, showing the concave-convex independent mode.

In this case, as shown in FIGS. 4A and 5A, by applying impact load to one end of shock absorbing member 1 in a direction of the axis (or the axial direction), the shock absorbing member begins to be buckled while a ridge of each corner 1e, 1f, 1g and 1h is inclined in the same circumferential direction (Y), i.e., towards the side (in the X-direction) on which each dimple 2a, 2b, 2c and 2d is arranged, respectively. By virtue of this, the above concave-convex independent mode can be purposely induced.

In other words, the bead in the invention functions as a buckling-inducing part for purposely inducing the concave-convex independent mode. Concretely, the bead has a function for determining the direction of the inclination of the ridge of each corner so that the ridges are inclined in the same direction in relation to the circumferential direction when the shock absorbing member begins to be buckled in the axial direction. Therefore, the bead of the invention is different from a conventional bead having a function to provide the origin (or the start point) of the buckling, and does not directly become the origin of the buckling. Rather, the bead of the invention has a function for rapidly making the transition to the concave-convex independent mode after the ridge of the corner is inclined (or after the buckling).

Figure 5B:
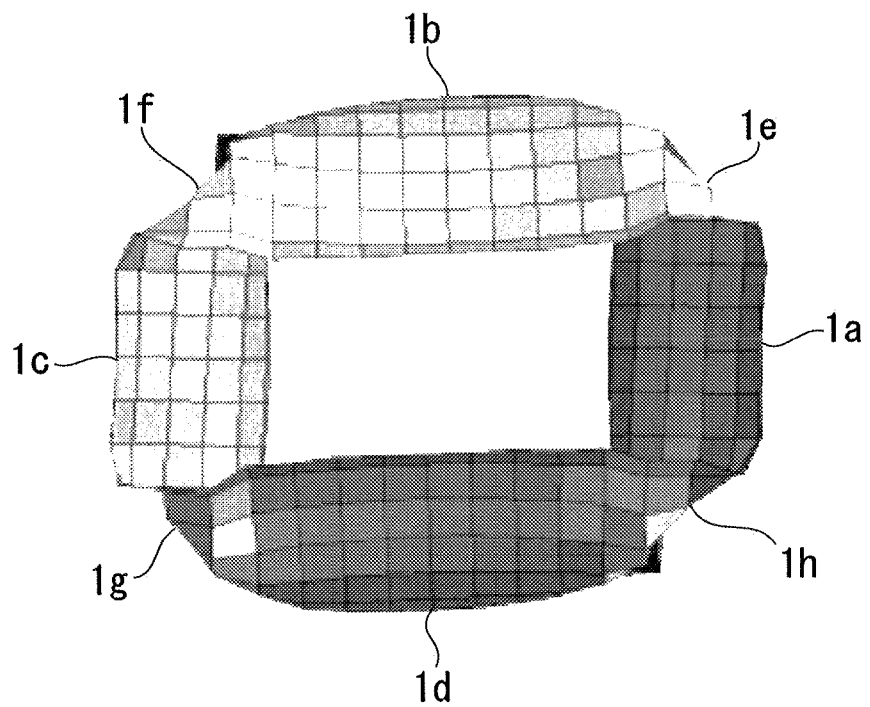
FIG. 5B is a transverse cross-sectional view of the hollow columnar member after buckling, calculated by FEM numerical analysis, showing the concave-convex mixed mode.

On the other hand, in the concave-convex mixed mode, as shown in FIG. 5B, when the member begins to be buckled, the ridges of corners 1e, 1f, 1g and 1h are inclined in different directions. As a matter of convenience, each component in FIG. 5B equivalent to the component in FIG. 5A is provided with the same reference numeral as in FIG. 5A.

The shock absorbing member according to the present invention can be effectively buckled in the axial direction thereof, by purposely inducing the above concave-convex independent mode. As a result, the amount of externally-applied impact energy absorption is increased, whereby remarkable shock-absorbing performance can be obtained.

When such a shock absorbing member is used in a chassis of a motorcar, etc., fuel efficiency and motion performance are improved while balancing reduced weight and high stiffness, and further, the chassis may have a structure with high collision-safety performance.

Although shock absorbing member 1 as shown in FIG. 4A is exemplified, the shock absorbing member of the invention is not limited as such, and may have various configurations. In other words, the invention may be widely applied to a hollow columnar shock absorbing member with a hollow polygonal cross-section, which absorbs externally-applied impact energy while buckling (or crushing) in the axial direction thereof.

Concretely, as the shock absorbing member, for example, a thin-walled structure formed as a hollow column (or a hollow columnar member), constituted by joining a press-formed steel plates by welding, etc., may be used. In this case, the bead may be formed by press-forming, etc., before and/or after joining the hollow columnar member.

A material of the shock absorbing member is not limited to a steel plate as described above. For example, the material may be a metal such as iron, aluminum, copper or an alloy thereof; or a resin such as an FRP, as long as the member can absorb externally-applied impact energy while buckling (or crushing) in the axial direction thereof. Further, the shock absorbing member is not limited to a member formed by joining plates by welding, etc., and may be a hollow columnar member formed by extrusion molding, etc. In this case, the bead may be formed by press-forming, etc., after forming the hollow columnar member. In addition, it is preferable that the shock absorbing member have a hollow cross-section with a triangular, quadrangular, pentagonal, hexagonal, heptagonal or octagonal shape, for example, in order to balance reduced weight and high stiffness.

The beads are not limited to the dimples of concave portions formed on the outer surface of shock absorbing member 1 as shown in FIG. 4A, and may be a plurality of bulges which bulge from the outer surface of shock absorbing member 1. With reference to FIG. 4B, a shock absorbing member 1' with a hollow square cross-section has four walls 1a', 1b', 1c' and 1d' and a plurality of bulges 2a', 2b', 2c' and 2d' formed as beads on four walls 1a', 1b', 1c' and 1d', respectively. Bulges 2a', 2b', 2c' and 2d' are positioned while being deviated towards corners 1e', 1f', 1g' and 1h' which are positioned on the same side relative to centers Pc' of four walls 1a', 1b', 1c' and 1d' in relation to a circumferential direction as indicated by an arrow Y, respectively. In addition, each bulge 2a', 2b', 2c' and 2d' is formed as a portion of a spherical surface.

When the beads correspond to a plurality dimples formed on the outer surface of shock absorbing member 1, as schematically shown in FIG. 4A, the shock absorbing member begins to be buckled while the ridge of each corner 1e, 1f, 1g and 1h is inclined in the circumferential direction towards the side (in the X-direction) on which each dimple 1a, 1b, 1c and 1d is arranged, respectively. On the other hand, in shock absorbing member 1' schematically shown in FIG. 4B, when bulges 2a', 2b', 2c' and 2d' bulging outward from the outer surface of the member are positioned while being deviated towards corners 1e', 1f', 1g' and 1h' which are positioned on the same side in relation to a circumferential direction as indicated by an arrow Y', respectively, the shock absorbing member begins to be buckled while the ridge of each corner 1e', 1f', 1g' and 1h' is inclined in the circumferential direction towards an opposite side (in the X'-direction) of the side on which each bulge 1a', 1b', 1c' and 1d' is arranged, respectively.

Figure 6A:
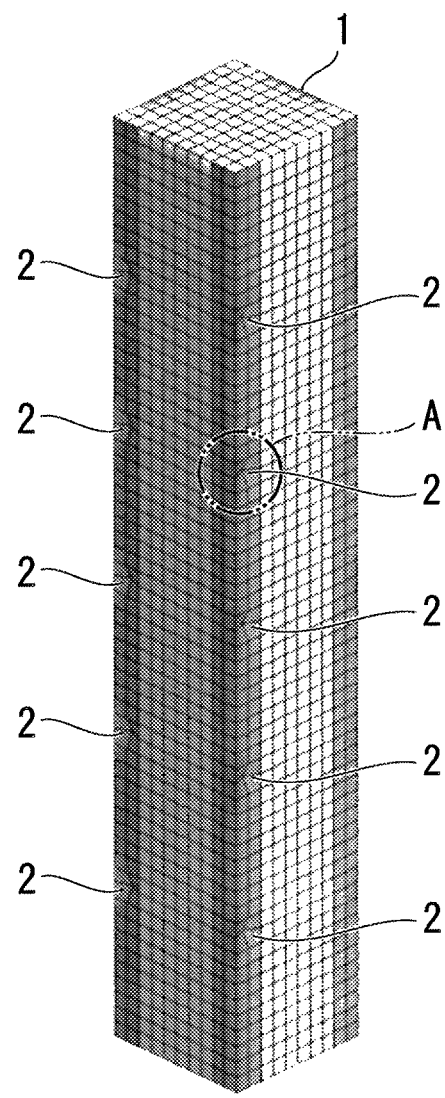
FIG. 6A is a perspective view of a shock absorbing member according to the present invention.
Figure 6B:
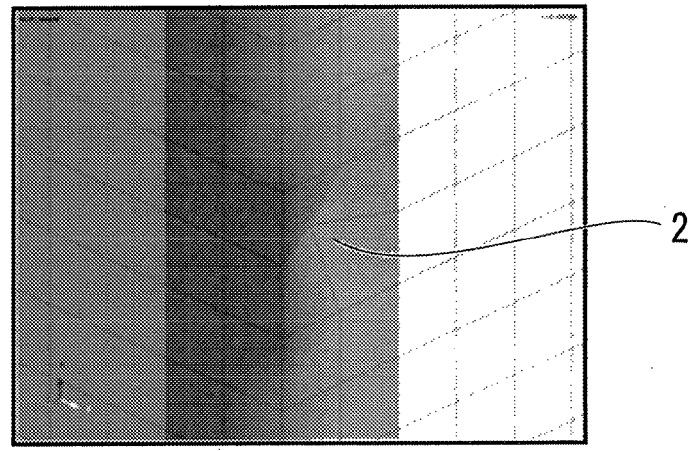
FIG. 6B is an enlarged view of a circle "A" in FIG. 6A.

As shown in FIGS. 6A and 6B, the beads or dimples 2 may be aligned in the axial direction, from a start end of the buckling of shock absorbing member 1. In this case, it is preferable that dimples 2 be positioned at an interval corresponding to a length of one side of the wall. Further, it is preferable that dimple 2 closest to the start end be positioned so as to be separated from the start end by a distance which is more than a half of the length of one side of the wall. By virtue of this, the shock absorbing member can be stably buckled into concertinas. The above positioning of the beads is also applicable to the case wherein the beads are bulges protruding from the outer surface of shock absorbing member 1.

Figure 7A:
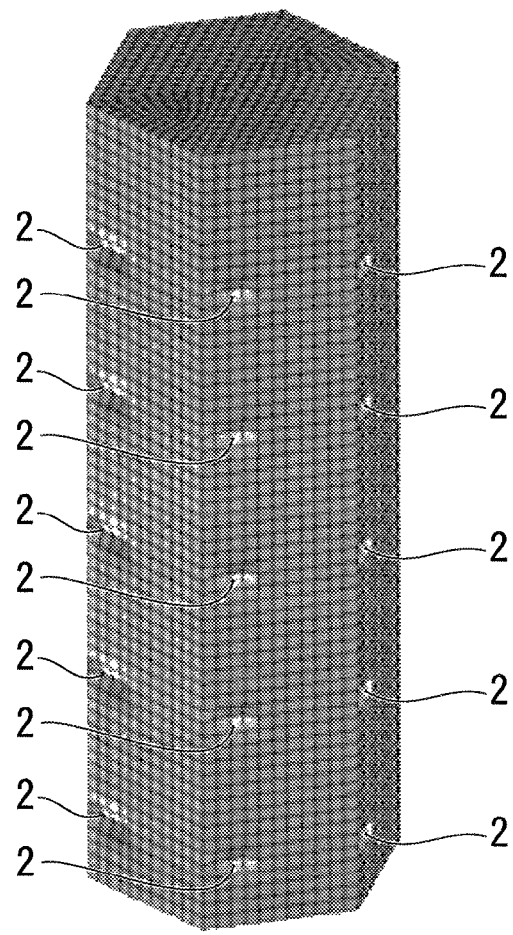
FIG. 7A is a perspective view of a modification of a shock absorbing member according to the present invention.
Figure 7B:
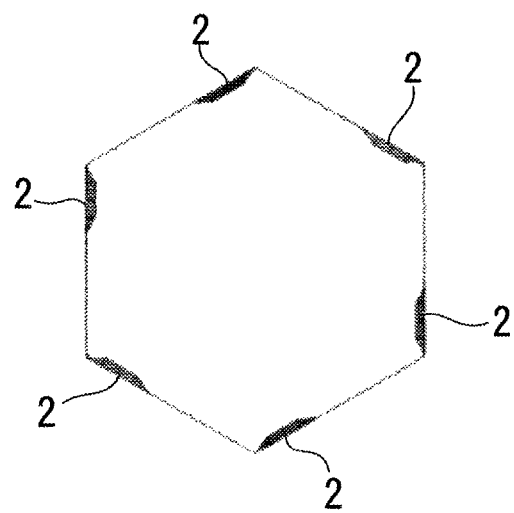
FIG. 7B is a transverse cross-sectional view of the shock absorbing member of FIG. 7A.

The shape of the bead is not limited the above dimple or bulge having a portion of a spherical surface, as long as the bead has a function of the invention. For example, the bead may have a V-shaped or U-shaped cross-section. Dimple 2 as shown in FIGS. 7A and 7B is configured as a concave portion with a trough shape extending in a direction (or a transverse direction) perpendicular to the axial direction of shock absorbing member 1. In this case, the function of the bead of the invention may be further improved. Preferably, a length $L_1$ of trough-shaped concave portion 2, in a direction perpendicular to axis O of shock absorbing member 1, is represented as below, wherein "W" is a width of the wall (or a distance between the ridges of shock absorbing member 1).

$$(1/10)W \leq L_1 \leq (3/4)W$$

Preferably, a length $L_2$ of trough-shaped concave portion 2, in a direction of axis O of shock absorbing member 1, is represented as below.

$$(1/20)L_1 \leq L_2 \leq L_1$$

Preferably, a distance $L_3$ between concave portion 2 and the ridge is represented as below, wherein "T" is a thickness of the plate.

$$T \leq L_3 \leq (1/3)T$$

According to the invention, by arranging the bead on at least one of the walls constituting the hollow cross-section of the shock absorbing member so that the bead is deviated towards one corner of the wall, the above concave-convex independent mode can be purposely induced. In other words, in the invention, the bead deviated towards one corner of at least one wall functions as the origin for determining the direction of the inclination of the ridge on the side towards which the bead is deviated. Similarly, the other ridges are induced to incline in the same direction as the ridge of the corner which becomes the origin.

However, in order that the corners are stably inclined in the same direction, it is preferable that the bead be deviated towards the corner in two or more walls. More preferably, the bead is deviated towards the corner in all of the walls. A portion of the hollow cross-section of the shock absorbing member, to which the bead is provided, will become a valley (or a concave portion) of the concertinas after the buckling. Therefore, when the bead is arranged on all of the walls, a corner in the transverse cross-section, to which the bead is not provided, can be prevented from being a peak (or a convex portion) of the concertinas after the buckling. In addition, when the bead is positioned so as to be deviated towards the corner on the plurality of walls, it is preferable that the wall constituting an opposing corner of the hollow cross-section of the polygonal shape is preferentially provided with the bead, in view of the balance of arrangement of the beads.

In the invention, "the bead is positioned so as to be deviated towards the corner" means that the bead is displaced towards the corner so that the center of the wall does not exist in the bead (i.e., the center is not deformed). Further, it is preferable that the beads be positioned in the vicinity of the corners which are located on the same sides with respect to the circumferential direction. In this regard, "in the vicinity of the corner" means the position near the corner so that the ridge of the corner does not exist in the bead (i.e., the corner is not deformed), and a distance between the center of the bead and the corner is equal to or smaller than a quarter of a width of the wall. In the invention, by positioning the bead in the vicinity of the corner, the ridge of the corner can be stably inclined. On the other hand, when the bead is formed on the corner, the buckling is stably carried out, whereas the load supported by the corner is decreased. As a result, the amount of energy absorption due to the buckling is decreased.

In addition, in the invention, by conforming the direction of the deviation of the bead to a direction of a torsional load applied to the shock absorbing member, the impact absorbing performance of the shock absorbing member is also effective for the torsional load.

EXAMPLES

Hereinafter, the effect of the present invention will be more clearly explained. The invention is not limited to following examples, and numerous modifications could be made thereto, without departing from the basic concept and scope of the invention.

First, in relation to shock absorbing members of working examples 1, 2 and comparative examples 1 to 3, deformation states thereof were calculated by FEM numerical analysis (computer simulation), when the impact load is applied to one end of the member in the axial direction of the member. As an analysis condition of the FEM numerical analysis, a linear hollow columnar member with a square hollow cross-section, having a plate thickness of 1.4 mm, a side length of 50 mm and an axial length of 300 mm, was used as a model. Material constants of the model are indicated in table 1 as follows.

TABLE 1

|  | K [GPa] | $\epsilon_0$ | n | D [1/ms] | D [1/ms] |
|---|---|---|---|---|---|
| Base Material | 1.5 | 0.001 | 0.2 | $1.0 \times 10^{10}$ | 3.0 |
| Four corners | 2.5 | | | | |

Then, the deformation state was calculated, when a rigid wall with a weight of 1000 kg fell at a rate of 4.44 m/s towards one end (or an upper end) of the hollow columnar member. In this regard, a constitutive equation used in the FEM numerical analysis was a Swift-Cowper-Symonds equation, as follows. In addition, an analysis time was 50 ms (milliseconds).

$$\sigma = K(\varepsilon_0 + \varepsilon^P)^n \left(1 + \left(\frac{\dot{\varepsilon}^P}{D}\right)^{\frac{1}{Y}}\right)$$

Comparative Example 1

As shown in FIG. 8A, in comparative example 1, the bead was not provided to the hollow columnar member. In this case, as shown in FIG. 9, although the concave-convex independent mode was represented for a moment in initial stage of the buckling, the mode was change to the concave-convex mixed mode immediately, and from that time, the deformation progressed in the concave-convex mixed mode.

Working Example 1

Figure 10:
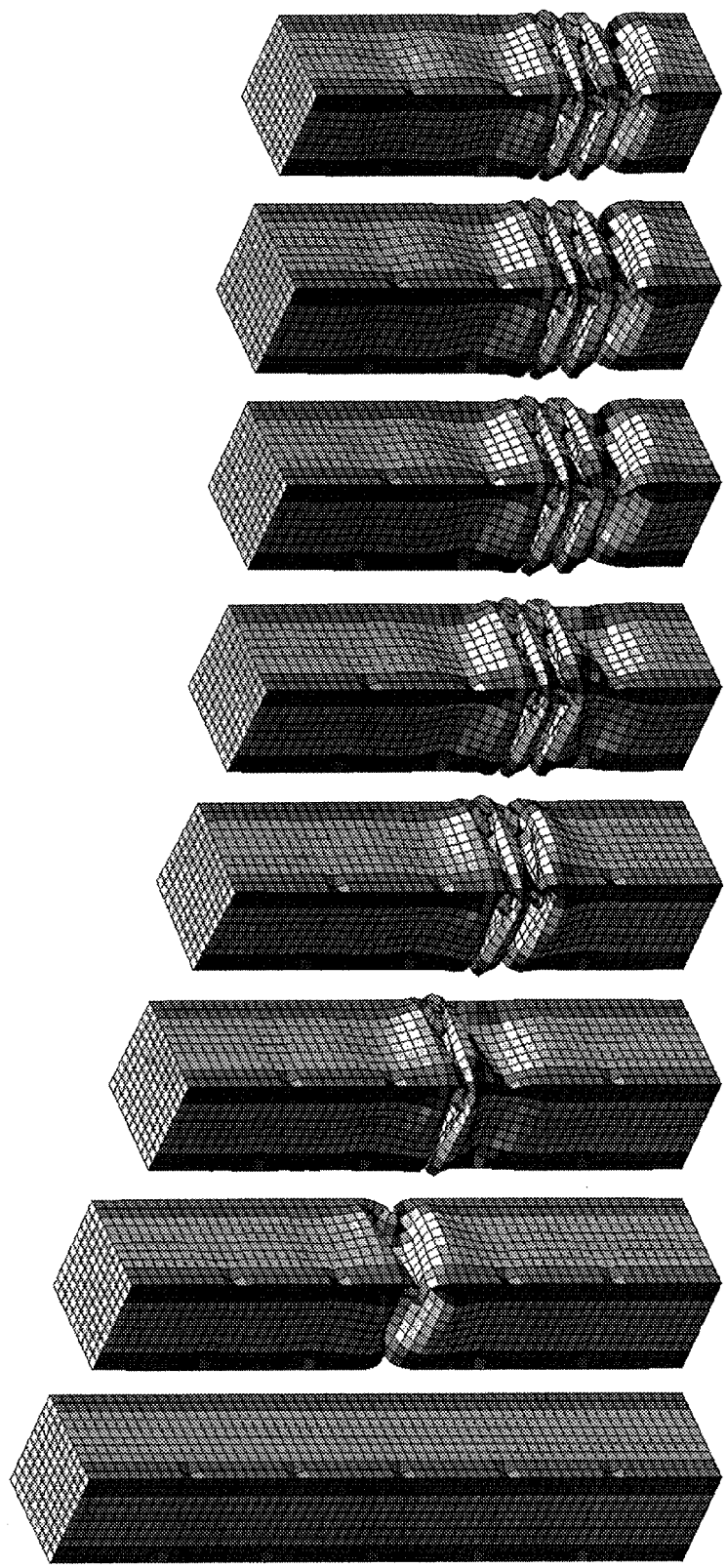
FIG. 10 is a perspective view of the shock absorbing member of working example 1, wherein deformation manner when impact load is applied to the shock absorbing member is calculated by FEM numerical analysis.

As shown in FIG. 8B, in working example 1, a bead or a dimple having a depth of 2.5 mm was arranged on each of four walls constituting the hollow columnar member, so that the beads were deviated towards corners positioned on the same side with respect to the circumferential direction. Further, the dimples were aligned in the axial direction of the member at intervals of 50 mm. In this case, as shown in FIG. 10, the bucking of the member progressed in the concave-convex independent mode from initial stage of the buckling.

Working Example 2

Figure 11:
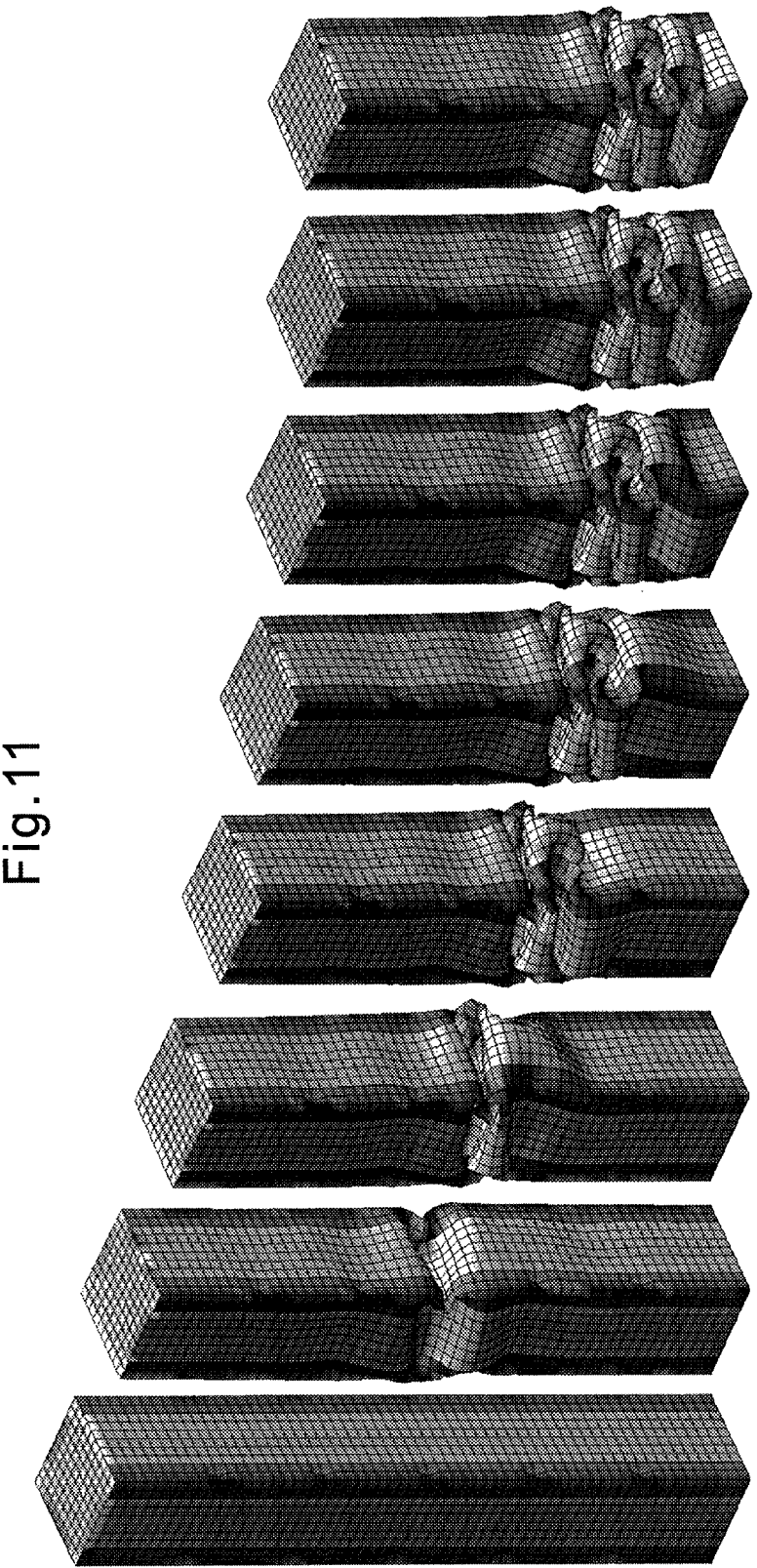
FIG. 11 is a perspective view of the shock absorbing member of working example 2, wherein deformation manner when impact load is applied to the shock absorbing member is calculated by FEM numerical analysis.

As shown in FIG. 8C, in working example 2, a bead or a dimple having a depth of 2.5 mm was arranged on each of four walls constituting the hollow columnar member, so that the beads were deviated towards corners positioned on the same side with respect to the circumferential direction. Further, the dimples were arranged in a row only on an upper part of the member in the axial direction of the member. In this case, as shown in FIG. 11, the bucking of the member progressed in the concave-convex independent mode from initial stage of the buckling. In addition, it is predicted that, if the buckling further progresses due to increase in the impact load, the bucking will progress in the concave-convex mixed mode, similarly to the case wherein the bead is not arranged.

Comparative Example 2

Figure 12:
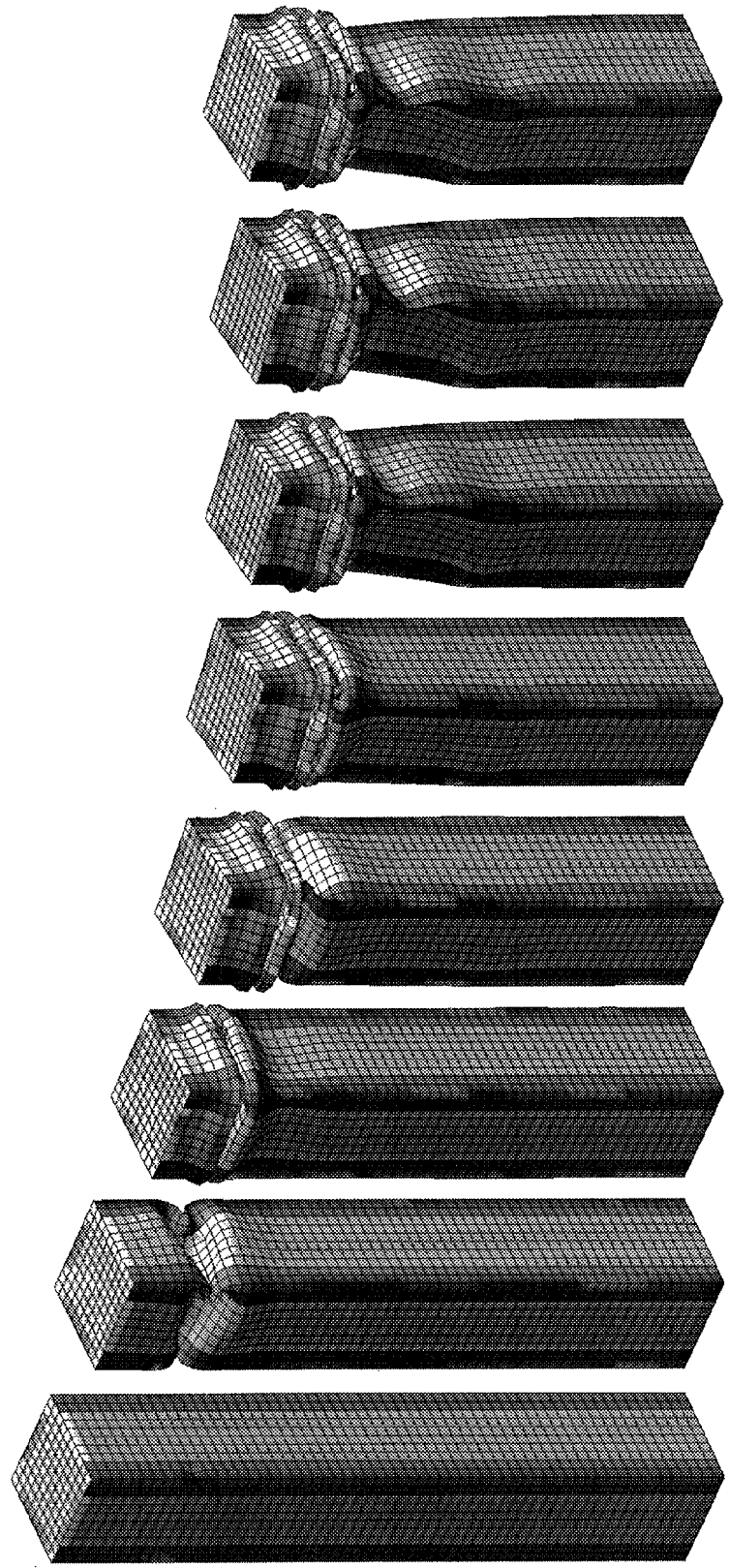
FIG. 12 is a perspective view of the shock absorbing member of comparative example 2, wherein deformation manner when impact load is applied to the shock absorbing member is calculated by FEM numerical analysis.

As shown in FIG. 8D, in comparative example 2, a groove extending in the axial direction was arranged on each of four walls constituting the hollow columnar member, so that the grooves were deviated towards corners positioned on the same side with respect to the circumferential direction. In this case, as shown in FIG. 12, although the concave-convex independent mode was represented for a moment in initial stage of the buckling, the mode was change to the concave-convex mixed mode immediately, and from that time, the deformation progressed in the concave-convex mixed mode.

Comparative Example 3

Figure 13:
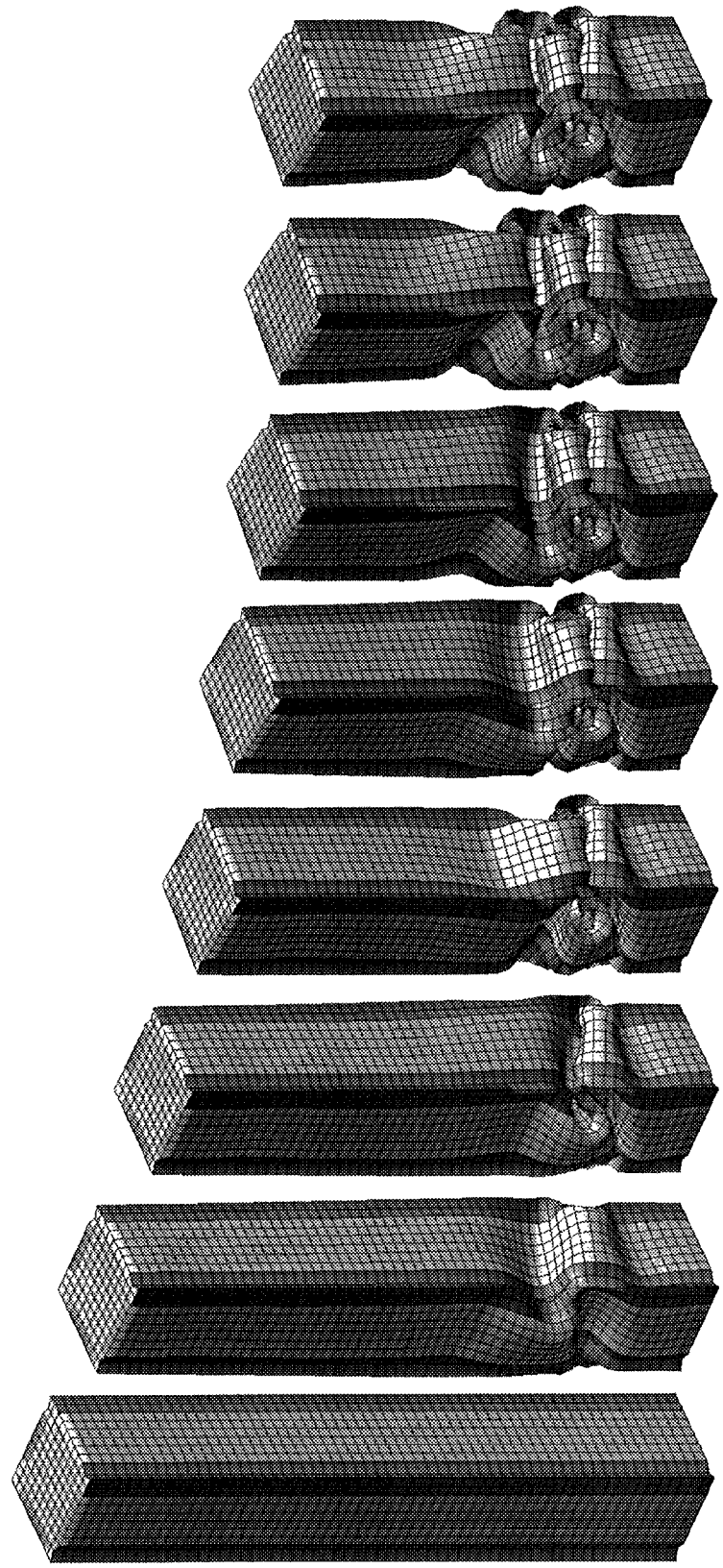
FIG. 13 is a perspective view of the shock absorbing member of comparative example 3, wherein deformation manner when impact load is applied to the shock absorbing member is calculated by FEM numerical analysis.
Figure 14A:
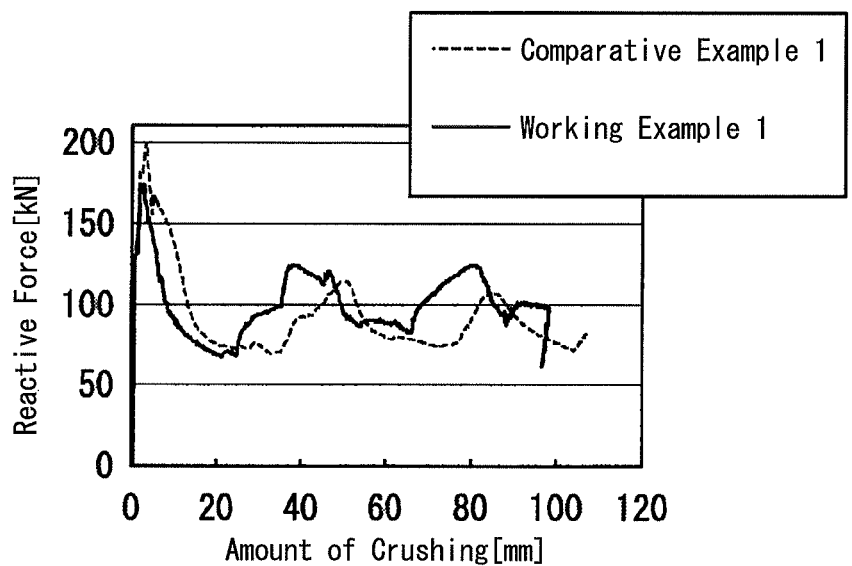
FIG. 14A is a graph showing a measurement of a relationship between a reactive force from the shock absorbing member and an amount of deformation (crushing) when impact load is applied to the shock absorbing member, in relation to working example 1 and comparative example 1.
Figure 14B:
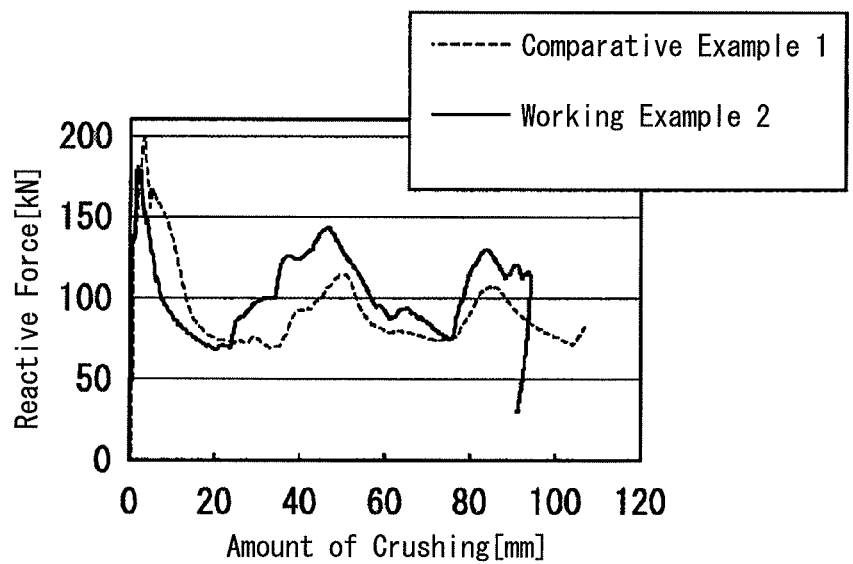
FIG. 14B is a graph showing a measurement of a relationship between a reactive force from the shock absorbing member and an amount of deformation (crushing) when impact load is applied to the shock absorbing member, in relation to working example 2 and comparative example 1.
Figure 14C:
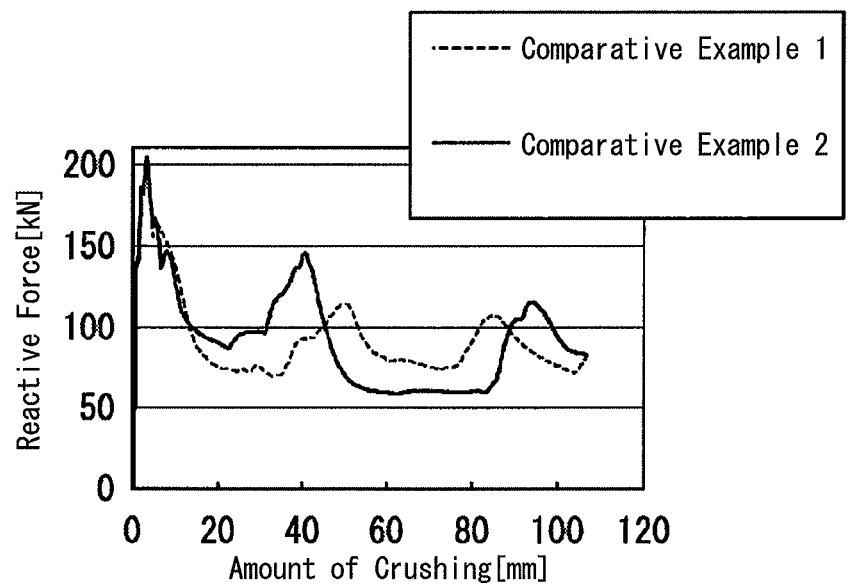
FIG. 14C is a graph showing a measurement of a relationship between a reactive force from the shock absorbing member and an amount of deformation (crushing) when impact load is applied to the shock absorbing member, in relation to comparative examples 1 and 2.
Figure 14D:
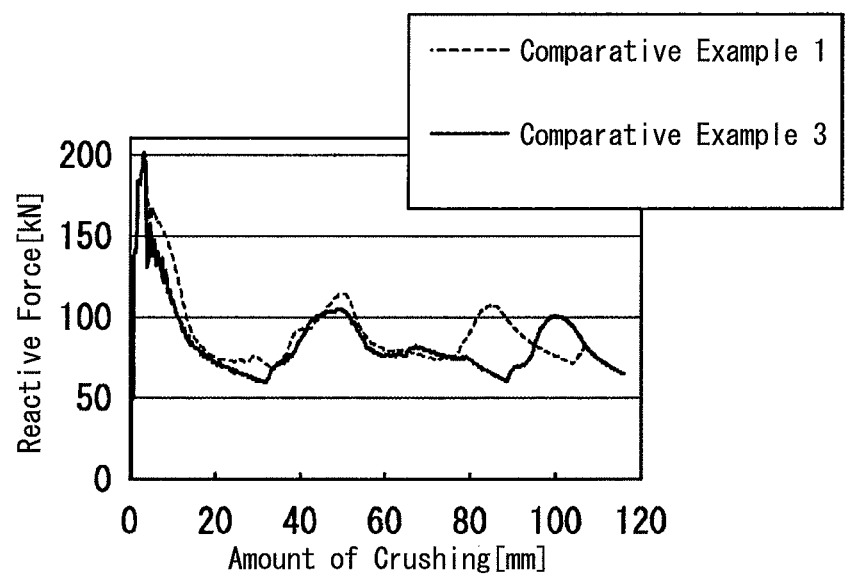
FIG. 14D is a graph showing a measurement of a relationship between a reactive force from the shock absorbing member and an amount of deformation (crushing) when impact load is applied to the shock absorbing member, in relation to comparative examples 1 and 3.
Figure 15A:
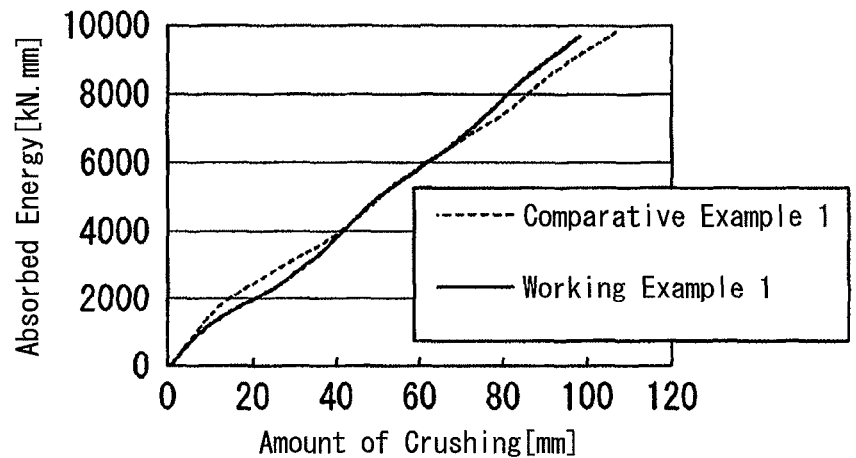
FIG. 15A is a graph showing a measurement of a relationship between an amount of energy absorption and an amount of deformation (crushing) when impact load is applied to the shock absorbing member, in relation to working example 1 and comparative example 1.
Figure 15B:
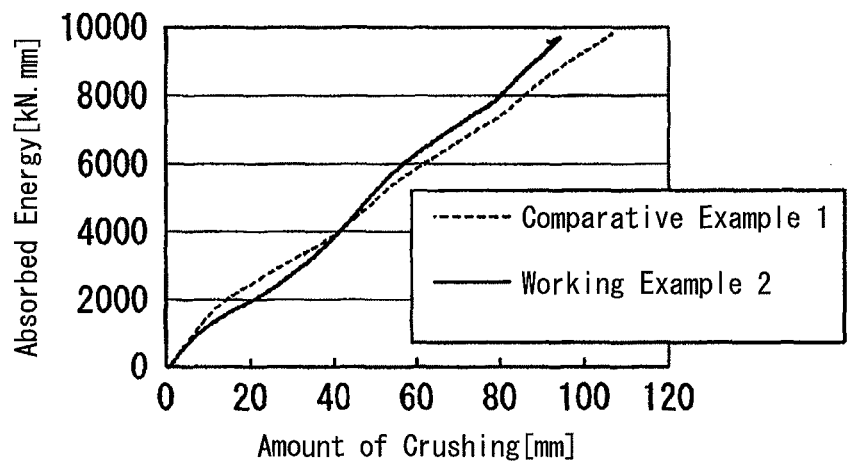
FIG. 15B is a graph showing a measurement of a relationship between an amount of energy absorption and an amount of deformation (crushing) when impact load is applied to the shock absorbing member, in relation to working example 2 and comparative example 1.
Figure 15C:
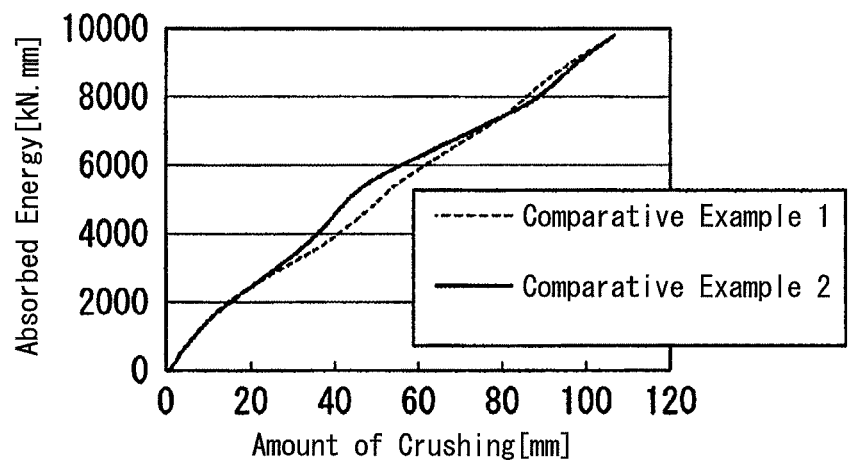
FIG. 15C is a graph showing a measurement of a relationship between an amount of energy absorption and an amount of deformation (crushing) when impact load is applied to the shock absorbing member, in relation to comparative examples 1 and 2.
Figure 15D:
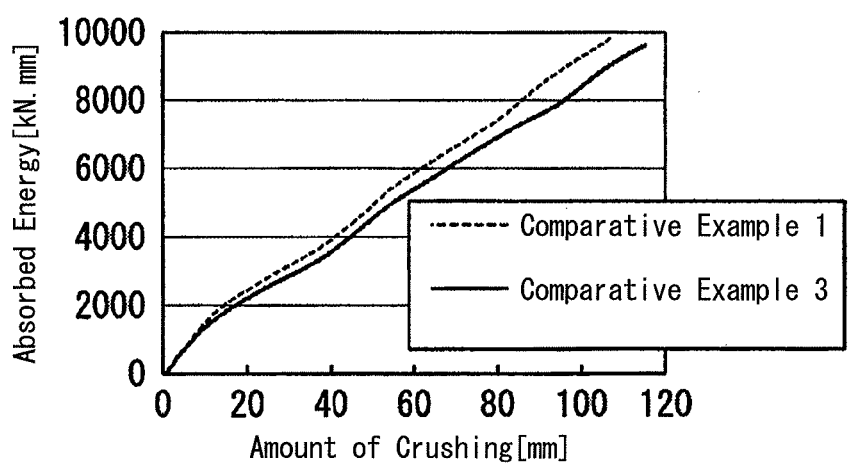
FIG. 15D is a graph showing a measurement of a relationship between an amount of energy absorption and an amount of deformation (crushing) when impact load is applied to the shock absorbing member, in relation to comparative examples 1 and 3.

As shown in FIG. 8E, in comparative example 3, a groove extending in the axial direction was arranged on each of three walls constituting the hollow columnar member, so that the grooves were deviated towards corners positioned on the same side with respect to the circumferential direction. In this case, as shown in FIG. 13, the bucking of the member progressed in the concave-convex mixed mode from initial stage of the buckling.

Next, FIGS. 14A to 14D indicate a result of measurement of the relationship between a reactive force from the shock absorbing member (or a resistive force of the member against the impact energy) and an amount of deformation (or an amount of crushing) when impact force was applied to one end of the member in the axial direction thereof, in relation to working examples 1, 2 and comparative examples 1 to 3. FIGS. 14A to 14D indicate the results of working example 1, working example 2, comparative example 2 and comparative example 3, respectively, and each result is compared to a result of comparative example 1. In this regard, since a product of the reactive force from the shock absorbing member and the amount of crushing corresponds to an amount of energy absorption, the impact absorbing performance of the member is improved as the reactive force is increased.

Further, FIGS. 15A to 15D indicate a result of measurement of the relationship between the amount of deformation (or the amount of crushing) and an amount of energy absorption when impact force was applied to one end of the member in the axial direction thereof, in relation to working examples 1, 2 and comparative examples 1 to 3. FIGS. 15A to 15D indicate the results of working example 1, working example 2, comparative example 2 and comparative example 3, respectively, and each result is compared to a result of comparative example 1.

As shown in FIGS. 14A to 14D and 15A to 15D, in the shock absorbing member of working examples 1 and 2, by inducing the concave-convex independent mode, a ratio of the amount of energy absorption relative to the amount of deformation (or crushing) was higher than comparative example 1 having the concave-convex mixed mode. In other words, the shock absorbing member of working examples 1 and 2 had improved shock absorbing performance.

REFERENCE SIGNS LIST 1 shock absorbing member
1' shock absorbing member
1a wall
1b wall
1c wall
1d wall
1a' wall
1b' wall
1c' wall
1d' wall
1e corner
1f corner
1g corner
1h corner
1e' corner
1f' corner
1g' corner
1h' corner
2a dimple
2b dimple
2c dimple
2d dimple
2a' bulge
2b' bulge
2c' bulge
2d' bulge

The invention claimed is:

1. A hollow columnar shock absorbing member comprising:
   an axis;
   a plurality of rectangular walls extending parallel to the axis; and
   a polygonal cross-section perpendicular to the axis, the shock absorbing member extending in a direction of the axis and being configured to absorb externally-applied impact energy while buckling in the direction of the axis, wherein
   the shock absorbing member has a plurality of beads formed on at least two walls among the plurality of walls, the plurality of beads providing the origin of buckling,
   the plurality of beads are positioned so as to be deviated towards one edge of each wall on which the plurality of beads are formed and so that a ridge of a corner does not exist in the bead and a distance between the center of the bead and the corner is a quarter of a width of the wall or less, the edges of the at least two walls extending parallel to the axis and being positioned on the same side with respect to a circumferential direction about the axis of the shock absorbing member, and
   the beads are separated in the axis direction.

2. The shock absorbing member according to claim 1, wherein the plurality of beads are positioned on a straight line in the direction of the axis on one wall at regular intervals.

3. The shock absorbing member according to claim 2, wherein the beads are aligned in the direction of the axis, from a start end of buckling of the shock absorbing member.

4. The shock absorbing member according to claim 2, wherein the bead includes a dimple formed on an outer surface of shock absorbing member.

5. The shock absorbing member according to claim 2, wherein the bead includes a budge which bulges from an outer surface of the shock absorbing member.

6. The shock absorbing member according to claim 1, wherein the plurality of beads are arranged on at least two of the plurality of walls one-by-one, and are positioned in the same plane perpendicular to the axis and in the vicinity of edges on the same side with respect to a circumferential direction about the axis of the shock absorbing member.

7. The shock absorbing member according to claim 6, wherein the bead includes a dimple formed on an outer surface of shock absorbing member.

8. The shock absorbing member according to claim 6, wherein the bead includes a budge which bulges from an outer surface of the shock absorbing member.

9. The shock absorbing member according to claim 1, wherein the same number of beads are arranged on each of at least two of the plurality of walls, and are positioned in a plurality of planes perpendicular to the axis and in the vicinity of edges on the same side with respect to a circumferential direction about the axis of the shock absorbing member, so that the beads are positioned on straight lines extending in the direction of the axis.

10. The shock absorbing member according to claim 9, wherein the bead includes a dimple formed on an outer surface of shock absorbing member.

11. The shock absorbing member according to claim 9, wherein the bead includes a budge which bulges from an outer surface of the shock absorbing member.

12. The shock absorbing member according to claim 1, wherein the bead includes a dimple formed on an outer surface of shock absorbing member.

13. The shock absorbing member according to claim 1, wherein the bead includes a budge which bulges from an outer surface of the shock absorbing member.

14. The shock absorbing member according to claim 1, wherein the bead includes a dimple formed on an outer surface of shock absorbing member.

15. The shock absorbing member according to claim 14, wherein the bead is a concave portion with a trough shape extending in a direction perpendicular to the direction of the axis of the shock absorbing member.

16. The shock absorbing member according to claim 1, wherein the bead includes a budge which bulges from an outer surface of the shock absorbing member.

\* \* \* \* \*